No. 645,223. Patented Mar. 13, 1900.
W. B. M. BASHLINE.
VALVE.
(Application filed Feb. 8, 1899.)
(No Model.)
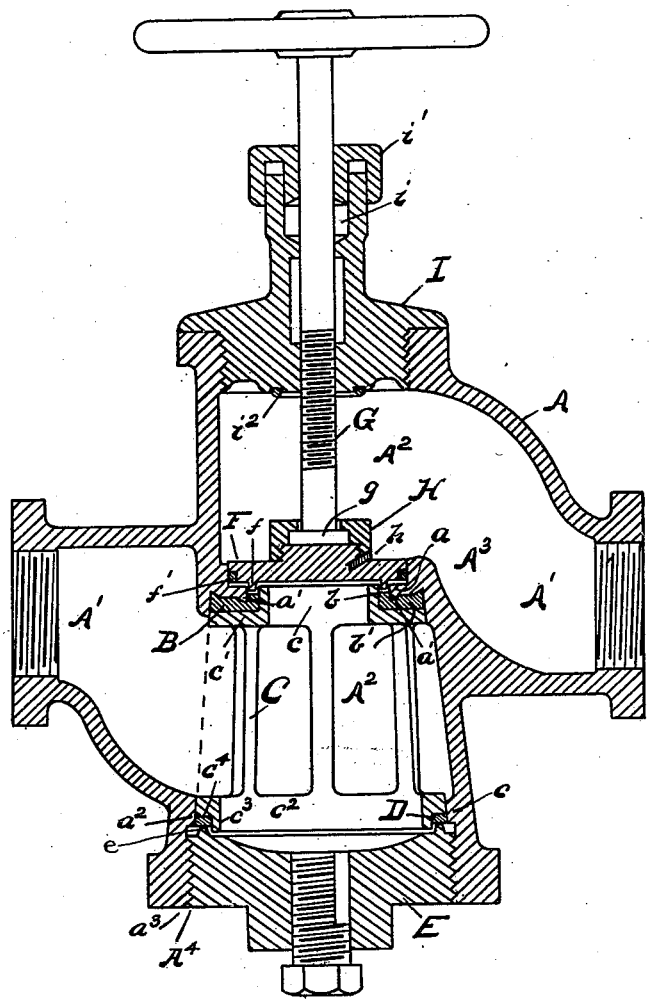
WITNESSES:
INVENTOR
William B. M. Bashline
BY
ATTORNEY

UNITED STATES PATENT OFFICE.

WILLIAM B. M. BASHLINE, OF MEADVILLE, PENNSYLVANIA, ASSIGNOR TO THE BASHLINE & COMPANY, OF WARREN, PENNSYLVANIA.

VALVE.

SPECIFICATION forming part of Letters Patent No. 645,223, dated March 13, 1900.

Application filed February 8, 1899. Serial No. 704,942. (No model.)

*To all whom it may concern:*

Be it known that I, WILLIAM B. M. BASH-LINE, a citizen of the United States, residing at Meadville, in the county of Crawford and State of Pennsylvania, have invented certain new and useful Improvements in Valves; and I do hereby declare the following to be a full, clear, and exact description of the invention, such as will enable others skilled in the art to which it appertains to make and use the same.

This invention relates to valves; and it consists in certain improvements in the construction thereof, as will be hereinafter fully described, and pointed out in the claims.

The objects of the invention are to provide a removable seat for a valve and improved connection between the disk and stem of the valve and means whereby the gland around the stem may be repacked while the valve is in use.

The invention is illustrated in the accompanying drawing, which shows a section through the center of a valve of my construction.

In the drawing, A marks the outer shell inclosing the valve-chamber $A^2$, which is provided with the usual inlet and outlet ports $A'$ $A'$. The valve-chamber $A^2$ is separated by a partition $A^3$, on which the valve operates. This partition is provided with an opening, forming the passage through the valve. Around this opening is an annular projection $a$, on the lower edge of which is a downwardly-extending lip $a'$. The valve-seat B is provided with the upward flange $b$, which forms the seat proper, and the outwardly-extending flange $b'$, which forms a gasket. A follower C is arranged to press the gasket $b'$ to its seat. This follower is provided with a ring $c'$, which contacts the gasket immediately under the lip $a'$, so that when pressure is applied the lip $a'$ is forced into the seat material B. The annular ring $c$ holds the upwardly-extending flange $b$ in position to form a proper seat for the valve. The shell A has an opening $A^4$ opposite the valve-seat, in which are a screw-thread $a^3$ and an annular shoulder $a^2$. The opening $A^4$ is throughout somewhat larger than the gasket $b'$ and ring $c'$, as indicated by the dotted lines at the left of the figure, so that when the follower C is started from its position it can be readily withdrawn through the opening $A^4$. At the lower end of the follower C is a ring $c^2$, which has a downwardly-projecting lip $c^3$, which forms an annular notch $c^4$ in the ring $c^2$ outside of the lip $c^3$. When the follower is pressed to position, the notch $c^4$ is above the bottom of the shoulder $a^2$. A gasket D is placed in the notch $c^4$. A plug E, having the annular rib $e$ in its upper surface, is screwed into the opening $a^4$, so as to bring the rib $e$ into contact with the gasket D. The effect of the pressure of the rib $e$ upon the gasket D is to make a closure between the rib $e$ and the gasket D and also to so spread the gasket D as to form a closure between the shoulder $a^2$ and the ring $c^2$.

The disk F of the valve is provided with an annular rib $f$ on its lower surface, which is designed to operate upon the valve-seat B. At the outer edge of the disk is a gasket or sheeting material $f'$, the purpose of which is to form a tight joint with the projection $a$ when the seat B, with the follower and other parts, is removed. The disk is operated by a screw-threaded stem G, having a head $g$, which operates in a cup H, screwed onto the top of the disk in the usual manner. In order to prevent the unscrewing of the cup H, I have made a hole through the cup into the disk and place in this hole some soft metal. This serves as a key to prevent the unscrewing of cup H in the ordinary use of the valve. When it is desired to remove the cup, however, a slight strain on the cup shears off the soft metal H and permits the disengagement.

The upper part of the chamber $A^2$ is closed by the usual cap I, having the gland $i$ with a pressure device $i'$, as usual. In order that the gland may be refilled while the valve is in operation, I provide on the lower part of the cap I a gasket or seat $i^2$, preferably of soft metal, against which the top cup H may be drawn by the action of the stem G, so as to close the stem-opening in the cap I. With the valve drawn up into contact with the seat $i'$ it will readily be seen that the packing in the glands $i$ may be replenished.

What I claim as new is—

1. In a valve, the combination with the valve-chamber having a projection, $A^3$, in which is the valve-opening, and on which is an annular projection, $a$, having a downwardly-extending lip, $a'$; of the valve-seat, B; and means for pressing said seat against and onto the lip, $a'$.

2. In a valve, the combination with the valve-chamber having a projection, $A^3$, in which is the valve-opening, and on which is an annular projection, $a$, having a downwardly-extending lip, $a'$, of the valve-seat, B; means for pressing said seat against and onto the lip, $a'$; and a valve provided with means for forming a secondary seat on the upper surface of the projection $a$.

3. In a valve, the combination with the shell containing the valve-chamber, a partition, $A^3$, having the valve-passage, and an opening, $A^4$, with the shoulder, $a^2$; means for carrying the valve-seat having the ring, $c^2$, thereon with an annular notch on its outer periphery, said notch being arranged to come above the bottom of the shoulder, $a^2$; and the gasket D, arranged in said notch.

4. In a valve, the combination with the shell containing the valve-chamber, a partition, $A^3$, having the valve-passage, and an opening, $A^4$, with the shoulder, $a^2$; means for carrying the valve-seat having the ring, $c^2$, thereon, with an annular notch on its outer periphery, said notch being arranged to come above the bottom of the shoulder, $a^2$; the gasket, D, arranged in said notch; and a plug, E, having the annular lip, $e$, arranged to come into contact with the gasket, D.

5. In a valve, the combination with the shell containing the valve-chamber, and having the partition, $A^3$, in which is the opening for the valve-passage, and on which is the annular projection, $a$, having the downwardly-extending lip, $a'$; the gasket and valve-seat, B; a follower, C, having the ring, $c$, and gasket-surface, $c'$; and means for exerting pressure on the follower, C.

6. In a valve, the combination with the shell, A, containing the valve-chamber, $A^2$, and having the partition, $A^3$, therein, through which is the valve-passage around which is arranged the projection, $a$, having the downwardly-extending lip, $a'$, said shell also having an opening, $A^4$, in which is a shoulder, $a^2$; a gasket and valve-seat, B, having the upper flange, $b$, and gasket portion, $b'$; the follower, C, having the ring, $c$, gasket-surface, $c'$, ring, $c^2$, having the downwardly-extending lip, $c^3$, and annular notch, $c^4$; the gasket, D, arranged in the notch, $c^4$; and the plug, E, having the annular rib, $e$, arranged to come into contact with the gasket, D.

7. In a valve, the combination with the shell, A, containing the valve-chamber, $A^2$, and having the partition, $A^3$, therein, through which is the valve-passage around which is arranged the projection, $a$, having the downwardly-extending lip, $a'$, said shell also having an opening, $a^4$, in which is a shoulder, $a^2$; a gasket and valve-seat, B, having the upper flange, $b$, and gasket portion, $b'$; the follower, C, having the ring, $c$, gasket-surface, $c'$, ring, $c^2$, larger in diameter than the ring, $c'$, and gasket, $b'$, having the downwardly-extending lip, $c^3$, and annular notch, $c^4$; the gasket, D, arranged in the notch, $c^4$; and the plug, E, having the annular rib, $e$, arranged to come into contact with the gasket, D.

In testimony whereof I affix my signature in presence of two witnesses.

WILLIAM B. M. BASHLINE.

Witnesses:
M. BURY,
H. C. LORD.